US012775893B2

(12) United States Patent
Goodman et al.

(10) Patent No.: US 12,775,893 B2
(45) Date of Patent: Oct. 27, 2026

(54) DEVICE ONBOARDING IN DISTRIBUTED SYSTEMS

(71) Applicant: Dell Products L.P., Round Rock, TX (US)

(72) Inventors: Bradley K. Goodman, Nashua, NH (US); Joseph Caisse, Burlington, MA (US); James Daniel Harms, Worthington, OH (US); John Jian Li, Westford, MA (US)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 18/643,273

(22) Filed: Apr. 23, 2024

(65) Prior Publication Data

US 2025/0328835 A1 Oct. 23, 2025

(51) Int. Cl.
*G06Q 10/0631* (2023.01)

(52) U.S. Cl.
CPC .............................. *G06Q 10/06312* (2013.01)

(58) Field of Classification Search
None
See application file for complete search history.

(56) References Cited

U.S. PATENT DOCUMENTS 11,102,243 B1 * 8/2021 Plenderleith ........ H04L 61/4511
11,399,285 B2 * 7/2022 Smith ................... H04W 12/50
11,522,755 B1 * 12/2022 Warkhedi .............. H04L 41/046
2022/0303338 A1 * 9/2022 Nguyen ................ H04L 41/082
2023/0085001 A1 * 3/2023 Adam ..................... H04L 63/20
726/1

FOREIGN PATENT DOCUMENTS

DE 102021122880 A1 * 4/2022 ......... H04L 67/1001

OTHER PUBLICATIONS

Maksuti, Silia, "Automated and Secure Onboarding for System of Systems," in IEEE Access, vol. 9, pp. 111095-111113, 2021, doi: 10.1109/ACCESS.2021.3102280. (Year: 2021).*

* cited by examiner

*Primary Examiner* — Mehmet Yesildag
*Assistant Examiner* — Michael Borowski
(74) *Attorney, Agent, or Firm* — WOMBLE BOND DICKINSON (US) LLP

(57) ABSTRACT

Methods and systems for managing endpoint devices are disclosed. The endpoint devices may be managed by onboarding them. To onboard the endpoint devices, ownership vouchers may be configured by a current owner of the endpoint device to include configuration policies when the endpoint device is being transferred from the current owner to a subsequent owner. Such configuration policies may be included in delegation information stored in the ownership voucher that the endpoint device can use for ascertaining of the endpoint device's current and previous owners. Such configuration policies may also specify what actions the endpoint device can or cannot implement during the onboarding.

20 Claims, 11 Drawing Sheets

DEVICE ONBOARDING IN DISTRIBUTED SYSTEMS

FIELD

Embodiments disclosed herein relate generally to device management. More particularly, embodiments disclosed herein relate to systems and methods to manage onboarding of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
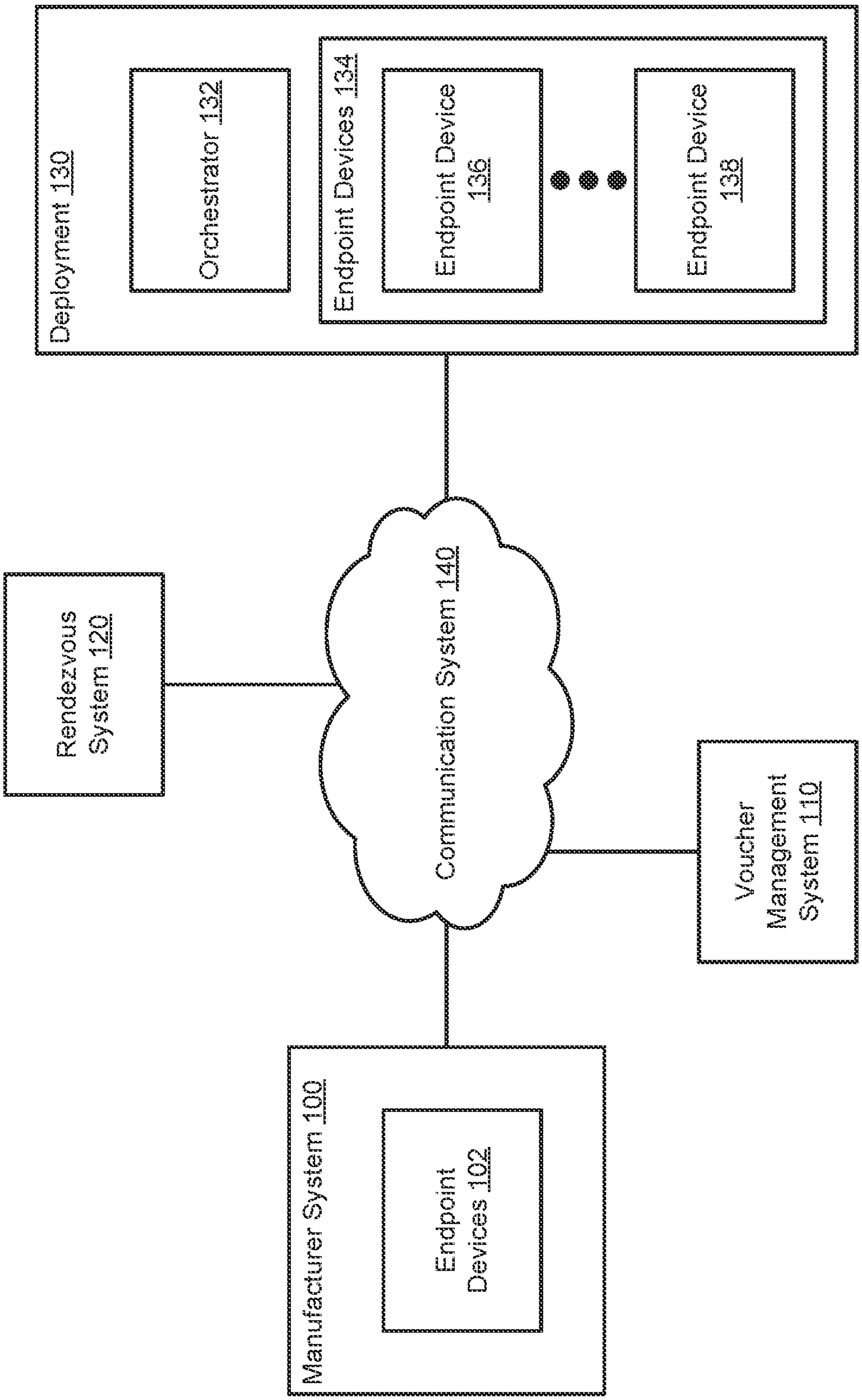
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing authority in a distributed system. To manage authority, endpoint devices may be onboarded.

During onboarding, authority over the endpoint devices may be established. To establish the authority, ownership vouchers, and/or other data structures may be presented to the endpoint devices. The endpoint devices may utilize these data structures to identify the entities that have authority over the endpoint devices.

Each of these entities may want to restrict how the endpoint devices are configured. For example, assume a scenario where a vendor (e.g., a manufacturer, a reseller, an intermediate owner, or the like) is providing an endpoint device as a curated (e.g., secured) appliance. The vendor may wish to specify the provisioning data (e.g., disk image, or the like) to be installed on the curated appliance. However, an ultimate owner of the endpoint device (different from the vendor) may wish to install different provisioning data, which may no longer make the endpoint device secure. This would defeat the purpose of the vendor going through specific procedures to make the endpoint device secured and curated, and the ultimate owner may not even be aware the consequences of his or her actions.

Said another way, if the intention was for the vendor to specify the provisioning data to obtain a secured, curated appliance, it would mean that the vendor would want to disallow a downstream customer from loading certain types of provisioning data (e.g., unauthorized provisioning data) onto the device. However, vendors will not be able to program such restrictions into endpoint devices intended for late-binding where an endpoint device is shipped out (or sold by a vendor) as a general-purpose computer that does not know its ultimate software, application, or purpose until the moment it is powered-on (e.g., by the downstream consumer). Thus, a mechanism is needed to enable late-binding systems (e.g., late-binding endpoint devices) to be able to determine what provisioning data (and/or onboarding instructions) can or cannot be implemented (e.g., executed).

To allow such late-binding endpoint devices to determine (post-shipment from a manufacturer and/or post-sale from a vendor who obtained the devices from the manufacturer) what provisioning data (and/or onboarding instructions) can or cannot be implemented (e.g., executed), each owner within the ownership chain (e.g., manufacturer, vendor, intermediate owners, ultimate owner, or the like), may specify configuration policies within the ownership vouchers of these endpoint devices. These configuration policies may be included in delegation information (discussed in more detail below in FIGS. 1B-1K) included in the ownership vouchers.

When an endpoint device is being onboarded, the endpoint device may use these configuration policies to determine what provisioning data (and/or onboarding instructions) can or cannot be implemented (e.g., executed). Thus, these configuration policies will not need to be specified (e.g., programmed into) the endpoint device before the device reaches an ultimate owner such that the device can remain a general-purpose device until it has reached the ultimate owner.

Accordingly, embodiments disclosed herein may address, among others, the above-discussed technical problem of defining restrictions and configuration policies in endpoint devices intended to be late-binding devices. The disclosed embodiments may do so by using configuration policies specified within an ownership voucher of an endpoint device as that endpoint device is being transferred from one owner to the next.

Additionally, by ensuring that devices intended to be secured and curated remain secured and curated, embodiments disclosed herein also directly improve the functionality and the security (e.g., by disallowing installation of unauthorized and/or potentially malicious software/applications) of these devices (e.g., these late-binding endpoint devices).

In an embodiment, a method for managing an endpoint device of endpoint devices in a deployment is provided. The method may include: during an onboarding of the endpoint device and by the endpoint device: obtaining one or more work orders, each of the one or more work orders comprising one or more operations to be executed to complete an onboarding of the endpoint device; obtaining one or more configuration policies that permit or bar execution of the one or more operations; and executing permitted ones of the one or more operations of the one or more work orders based on the one or more configuration policies to complete the onboarding of the endpoint device.

The one or more work orders are associated with a current owner of the endpoint device, and the one or more configuration policies are associated with a previous owner of the endpoint device that delegated ownership of the endpoint device to the current owner via an ownership voucher of the endpoint device.

The ownership voucher comprises delegation information associated with delegation of the endpoint device from the previous owner to the current owner, the one or more configuration policies being one of the delegation information.

The method may further include: after obtaining the one or more work orders and before executing the permitted ones of the one or more operations, validating an integrity of each of the one or more work orders using other ones of the delegation information beside the one or more configuration policies.

The one or more work orders comprise a first work order and the one or more operations of the first work order comprise a first operation. Executing the permitted ones of the one or more operations of the first work order based on the one or more configuration policies may include: determining whether at least one of the one or more configuration policies prohibit execution of the first operation; in an instance where the execution of the first operation is prohibited by at least one of the one or more configuration policies, skipping the first operation without executing the first operation as part of completing the onboarding of the endpoint device; and in an instance where the execution of the first operation is not prohibited by at least one of the one or more configuration policies, executing the first operation as part of completing the onboarding of the endpoint device.

Obtaining the one or more work orders may include: obtaining a first work order comprising a first set of operations, the first work order being associated with the current owner of the endpoint device; and obtaining a second work order comprising a second set of operations, the second work order being associated with the previous owner of the endpoint device. Executing the permitted ones of the one or more operations may include: generating a final work order based on the first work order, the second work order, and the one or more configuration policies, the final work order comprising a final set of operations, wherein the final set of operations are executed to complete the onboarding of the endpoint device.

The one or more configuration policies permit or bar execution of only operations of the first set of operations.

After obtaining the first work order and the second work order and before generating the final work order, validating that the first work order and the second work order are both trusted using the ownership voucher.

The first set of operations comprises a first operation; the second set of operations comprises a second operation, the first operation conflicts with the second operation; and generating the final work order may include: determining that at least one of the one or more configuration policies bar execution of the first operation; and including the second operation in the final set of operations instead of the first operation.

The first set of operations comprises a third operation; the second set of operations comprises a fourth operation, the third operation conflicts with the fourth operation; and generating the final work order may include: determining that the one or more configuration policies permit execution of the third operation; and including the third operation in the final set of operations instead of the fourth operation.

In an embodiment, a non-transitory media is provided. The non-transitory media may include instructions that when executed by a processor cause the computer-implemented method to be performed.

In an embodiment, a data processing system (e.g., an endpoint device) is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, any number of endpoint devices may be deployed to a deployment. The endpoint devices may cooperatively provide the computer implemented services.

To manage the endpoint devices to provide the computer implemented services, authority over the endpoint devices may need to be established. In other words, the endpoint devices must be able to ascertain that they are under the authority of a particular entity. Based on this authority, the entity may, for example, issue work order and/or other types of instructions to manage the operation of the endpoint devices to provide desired computer implemented services.

To facilitate ascertaining of the authority over them, the endpoint devices may utilize secrets. The secrets may allow the endpoint devices to cryptographically verify delegations of authority over the endpoint devices from a root of trust (e.g., a trusted key of a manufacturer) to another entity (e.g., an owner).

Overtime the resources requirements for providing computer implemented services may change and/or endpoint devices may need to be replaced. For example, additional services may be desired to be provided, different types of services may be desired to be provided, etc. In another example, an endpoint device that contributed to the computer implemented services may cease to operate thereby reducing the quantity of resources available to provide the computer implemented services. To satisfy the resource requirements based on these changes to an exist systems, additional endpoint devices may be onboarded and thereby contribute to the resources available to provide the computer implemented services.

However, onboarding an endpoint device may require the endpoint device to know what data and/or processes can or cannot be implemented (e.g., executed, performed, or the like) during the onboarding. Endpoint devices (e.g., late-binding endpoint devices) may not initially be programmed with knowledge about such restrictions.

Thus, in general, embodiments disclosed herein may provide methods, systems, and/or devices for managing endpoint devices to improve an onboarding process of the endpoint devices.

To improve the onboarding process and provide these endpoint devices with knowledge (e.g., information) about what data and/or processes can or cannot be implemented (e.g., executed, performed, or the like) during onboarding, a current owner of the endpoint device may specify (e.g., define, store, include, or the like) configuration policies within an ownership voucher of endpoint device when passing (e.g., delegating ownership and authority of) the endpoint device to a subsequent (e.g., next) owner. Such configuration policies may be included in delegation information stored in the ownership voucher that the endpoint device can use to ascertaining of the endpoint device's current and previous owners.

The configuration policies may include one or more policies that specifies what can or cannot be done during the onboarding of the endpoint device. For example, in one of the policies of the configuration policies, a vendor of the endpoint device may restrict installation of applications and/or software to only those authorized by the vendor. Installation of any unauthorized applications and/or software by the current owner may void the endpoint device's warranty that is provided by the vendor (or violate one or more clauses in a formal contract or agreement formed between the vendor and the current owner).

As another example, in another policy of the configuration policies, a current owner of the endpoint device may want to allow the subsequent owner of the endpoint device to configure certain parameters of the endpoint device. The policy may explicitly specify that parameters A and C are allowed to be configured (e.g., overridden, or the like).

To provide the above noted functionality, the system of FIG. 1A may include manufacturer system 100, voucher management system 110, rendezvous system 120, deployment 130, and communication system 140. Each of these components is discussed below.

Manufacturer system 100 may be a system used by a manufacturer of endpoint devices 102. Manufacturer system 100 may include, for example, factories, assembly plants, distribution facilities, and/or other types of facilities for creating endpoint devices 102. Endpoint devices 102 may be data processing systems which may be usable to provide various computer implemented services.

When manufactured, manufacturer system 100 may put endpoint devices 102 in condition for subsequent onboarding to various deployments (e.g., 130) and/or other environments (e.g., data centers, edge systems, etc.) in which endpoint devices may be positioned to provide desired computer implemented services. Said another way, manufacturer system 100 may configure endpoint devices 102 as late-binding endpoint devices that will be configured later (e.g., during onboarding) when these late-binding endpoint devices are attached to a specific deployment (or deployments).

Figure 1B:
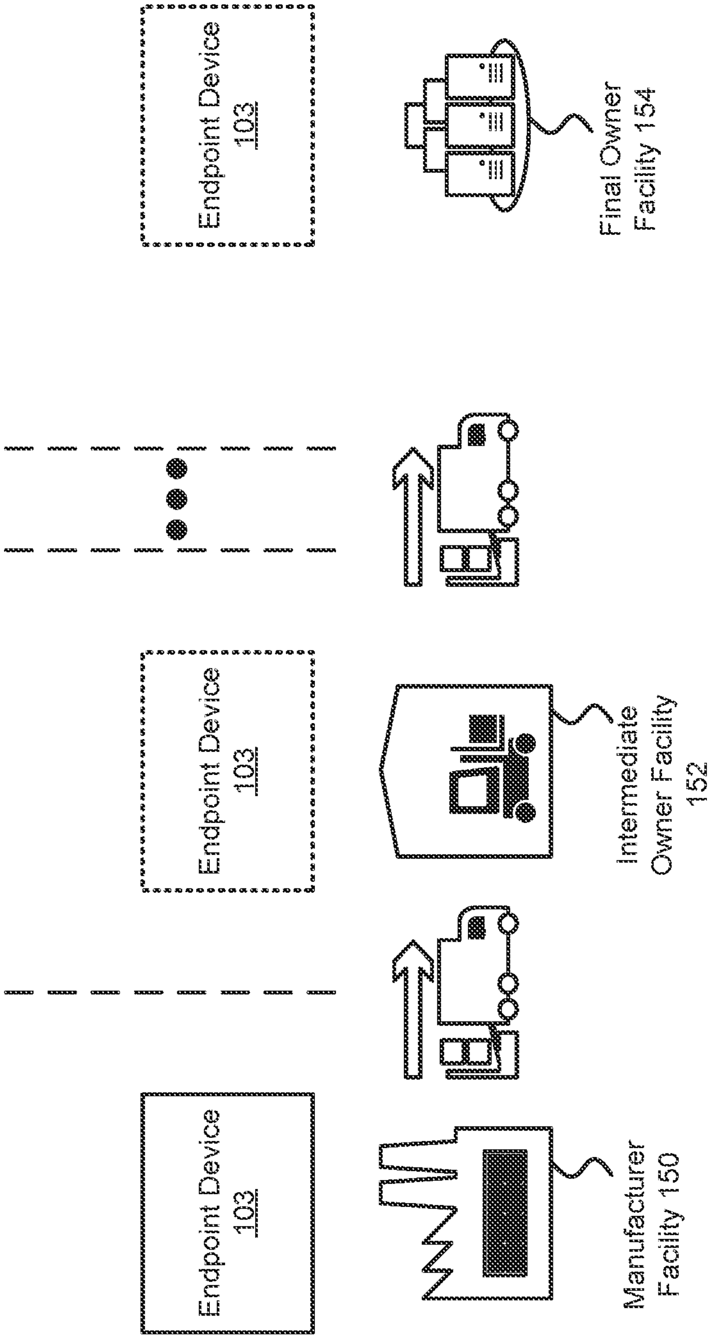
FIGS. 1B-1K show diagrams illustrating aspects of operation of the system of FIG. 1A in accordance with an embodiment.
Figure 1C:
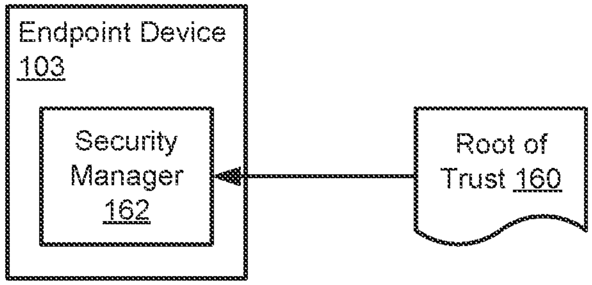

To place endpoint devices 102 in condition for subsequent onboarding, manufacturer system 100 may (i) establish a root of trust for each endpoint device, (ii) record various information regarding the endpoint devices (e.g., hardware/software loadout, identifiers of various components positioned therein, etc.), and (iii) install various pieces of software, establish various configuration settings (which do not include defining the configuration policies of these configuration settings), update various hardware components, and/or perform other actions so that only entities to which authority over the endpoint devices has been delegated from the root of trust are able to control and/or otherwise use the endpoint device. Refer to FIG. 1C for additional details regarding establishing a root of trust for the endpoint device.

Once constructed, endpoint devices 102 may be sold directly to end users and/or placed into the stream of commerce (e.g., sold to resellers, etc.) and through which endpoint devices 102 eventually reach end users. Refer to FIG. 1B for additional details regarding how endpoint devices may reach end users (e.g., individuals, organizations, etc.).

As ownership over the endpoint devices changes, information regarding the changes in ownership and/or authority may be recorded in an ownership voucher. The ownership voucher may allow an end user to establish authority over the endpoint device such that the endpoint device will be usable by the end user.

Voucher management system 110 may document and manage information regarding changes in ownership and authority over endpoint devices 102. To do so, voucher management system 110 may generate ownership vouchers. An ownership voucher may be a cryptographically verifiable data structure usable to establish which entities have authority over endpoint devices 102.

For example, an ownership voucher may include certificate chains that documents the changes in ownership and authority over endpoint devices 102. Each certificate may be signed using various keys. The keys used to sign (e.g., private keys) and keys included in (e.g., public keys) in ownership vouchers may enable endpoint devices to ascertain whether to trust various data structures, such as work orders which may be signed. Refer to FIGS. 1D-1I for additional information regarding ownership vouchers.

In embodiments, the ownership voucher may also include configuration policies (specified by owners of the endpoint device) that define (e.g., specify, or the like) what data and/or processes can or cannot be implemented (e.g., executed, performed, or the like) during onboarding of the endpoint device. This is discussed in more detail below in reference to FIGS. 1J-1K.

When one of endpoint devices 102 is obtained by an end user, the end user may add the endpoint devices to a collection such as deployment 130. When so added, an orchestrator (e.g., 132) or other entity may utilize a corresponding ownership voucher from voucher management system 110 to establish authority over the endpoint device. In this manner, any number of endpoint devices (e.g., 134) may be onboarded and brought under the control of a control plane which may include any number of orchestrators (e.g., 132). Different endpoint devices (e.g., 136, 138) may be onboarded at different points in time and/or for different purposes.

However, the ownership voucher provided by voucher management system 110 may delegate authority over the endpoint device to the end user by establishing a public key of a public private key pair maintained by the end user (e.g., via the orchestrator 132) as having been delegated authority over the endpoint device. To issue verifiable work orders or other types of instructions to the endpoint device, the work order may need to be signed by the private key of the public private key pair.

When one of endpoint devices 102 initially powers on after manufacturing, the endpoint device may reach out to rendezvous system 120. Rendezvous system 120 may be a system that directs endpoint devices to entities such as orchestrator 132 that will onboard the endpoint devices.

To do so, the entities such as orchestrator 132 may provide rendezvous system 120 with information usable to authenticate that orchestrator 132 will manage the endpoint devices. For example, orchestrator 132 may provide information from ownership vouchers, and/or other sources to rendezvous system 120. Once verified, rendezvous system 120 may redirect endpoint devices to the corresponding entities when the endpoint devices reach out to rendezvous system 120 after being powered on.

Once onboarded, endpoint devices 134 may perform various operations to complete onboarding. The operations may include any number and type of operation (e.g., configuration operations, security operations, software installation operations, account establishment operations, etc.), and the operations may be directed by orchestrator 132. Once onboarded, the endpoint devices may begin to contribute to computer implemented services by deployment 130. Such operations may require the retrieval and execution of the discussed bootable installers and/or disk images.

When providing their functionality, any of manufacturer system 100, endpoint devices 102, voucher management system 110, rendezvous system 120, deployment 130, orchestrator 132, and/or endpoint devices 134 may perform all, or a portion, of the processes, interactions, and methods illustrated in FIGS. 1B-3.

Any of manufacturer system 100, endpoint devices 102, voucher management system 110, rendezvous system 120, deployment 130, orchestrator 132, and/or endpoint devices 134 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 140. Communication system 140 may facilitate communications between the components of FIG. 1A. In an embodiment, communication system 140 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

As discussed above, endpoint devices (e.g., 102) may traverse through a stream of commerce between when the endpoint devices are manufactured and when the endpoint devices reaches a final owner. Turning to FIG. 1B, diagram of an example path through a stream of commerce in accordance with an embodiment is shown.

In FIG. 1B, vertical dashed lines indicate different geographic locations in which various facilities may be positioned. Representations of such facilities (e.g., 150-154) may be positioned below the pages. Representations of movement of endpoint devices between these facilities is illustrated using truck shaped images. Some instances of the graphical representation of endpoint device 103 are illustrated using dashed outlining to indicate that endpoint device 103 may only be present at one of the facilities at any point in time, and the instance of the graphical representation of endpoint device 103 drawn in solid outlining indicates where endpoint device 103 is located in the example shown in FIG. 1B.

The stream of commerce may begin, for example, at manufacturer facility 150. Manufacturer facility 150 may be a facility operated by a manufacturer of endpoint devices. During manufacturing, the manufacturer may establish a root of trust for an endpoint device (e.g., 103). Refer to FIG. 1C for additional details regarding establishing the root of trust for endpoint device 103. The root of trust may be used by endpoint device 103 to discern which entities have authority over it, which entities to trust, and/or for other purposes. The initial root of trust may indicate that the manufacturer is the owner of and has authority over endpoint device 103.

Once the root of trust is established, endpoint device 103 may be sold and resold to various intermediate owners. These intermediate owners may operate various intermediate owner facilities (e.g., 152), such as warehouses, distribution centers, sales rooms, etc. When sold, endpoint device 103 may be shipped to these various facilities.

Finally, once purchased from an intermediate owner, a final owner may operate a final owner facility (e.g., 154), such as a data center, edge deployment, and/or other type of computer deployment to which endpoint device 103 may be onboarded. To facilitate onboarding, voucher management system 110 may collect and add information regarding changes in ownership of endpoint device 103 to an ownership voucher. Orchestrator 132 may use the ownership voucher to establish authority over endpoint device 103.

Turning to FIG. 1C, a diagram of an example process for establishing a root of trust in endpoint device 103 in accordance with an embodiment is shown. To establish a root of trust, when endpoint device 103 is manufactured, root of trust 160 may be installed in endpoint device 103.

Root of trust 160 may be a public key of a public private key pair controlled by the manufacturer of endpoint device 103. The public private key pair may be established using any process.

To install root of trust 160, root of trust 160 may be stored in endpoint device 103. The storage location and security precautions taken with respect to storing root of trust 160 may vary depending on the architecture of endpoint device 103.

For example, endpoint device 103 may host or include a security manager (e.g., 162). Security manager 162 may be implemented using a discrete hardware component, or may be a software component. Security manager 162 may enforce various security policies on endpoint device 103. For example, the security policies may require that endpoint device 103 validate authority over it back to root of trust 160 before complying with any instructions from other entities that allege to have authority over endpoint device 103.

To validate entities having authority over endpoint device 103, endpoint device 103 may utilize ownership vouchers.

Figure 1D:
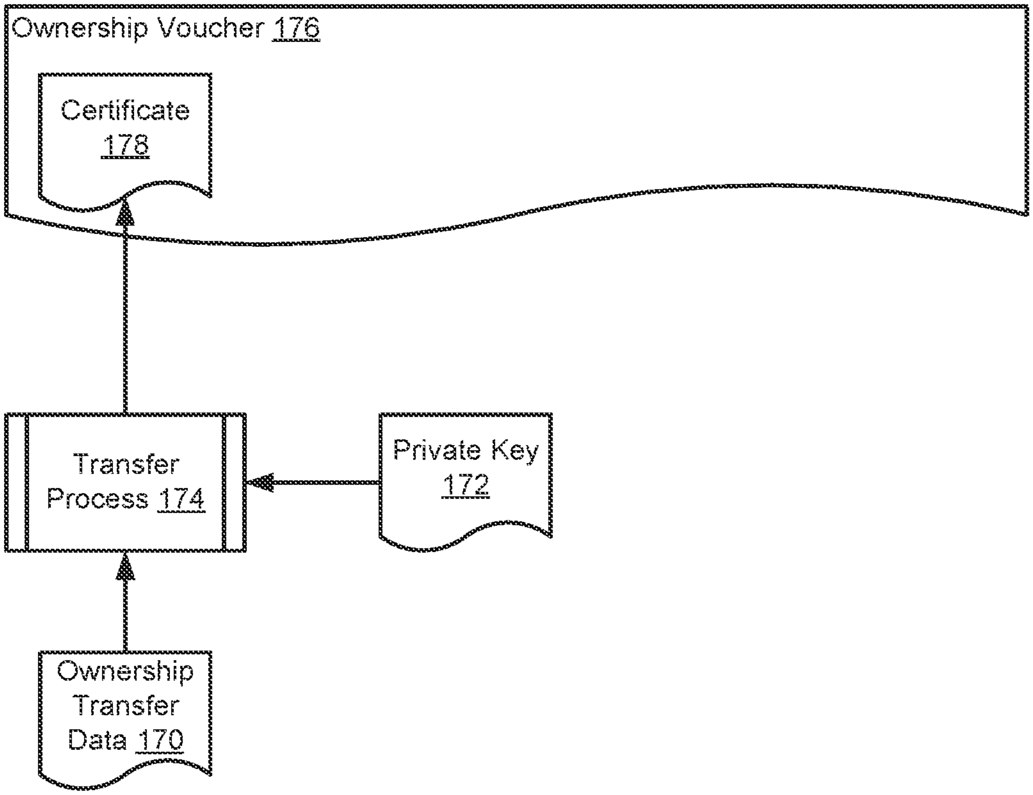
Figure 1E:
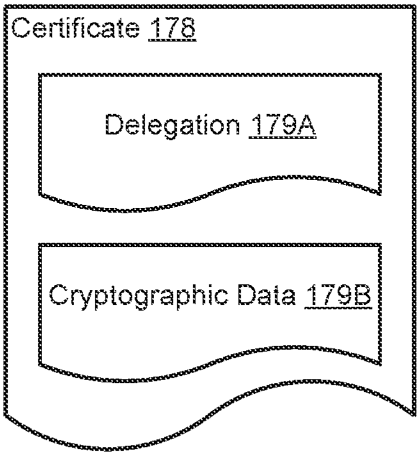

Turning to FIG. 1D, a diagram of an example process for generating ownership voucher 176 in accordance with an embodiment is shown. To generate ownership voucher 176, information regarding changes in ownership and authority over an endpoint device may be added. The information may take the form of a cryptographically verifiable certificate (e.g., 178). Refer to FIG. 1E for additional information regarding certificate 178.

To add a certificate to ownership voucher 176, transfer process 174 may be performed. During transfer process 174, ownership transfer data 170 and private key 172 may be obtained. Ownership transfer data 170 may document a change in ownership and/or authority over an endpoint device. For example, when an endpoint device is sold, a public key of a public private key pair controlled by the purchaser may be added to ownership transfer data 170, along with other types of information regarding the transfer. This public key may be usable to verify signed work orders or other signed data structures from the new owner (e.g., the new owner may be able to use the corresponding private key for signing). The information in ownership transfer data 170 may be treated as a delegation statement, which an endpoint device may parse to identify entities having authority over it.

Figure 1F:
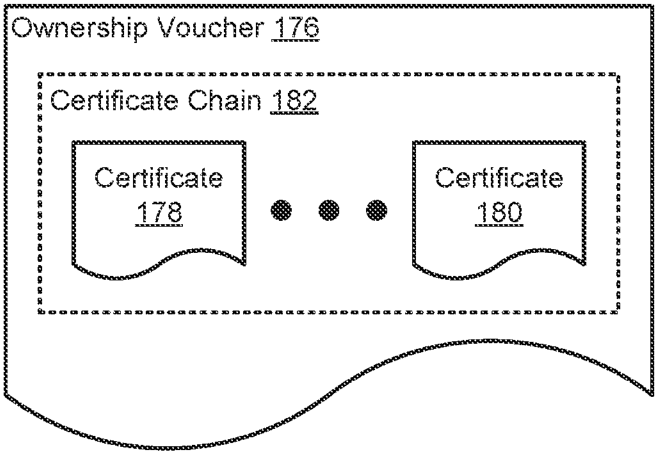
Figure 1G:
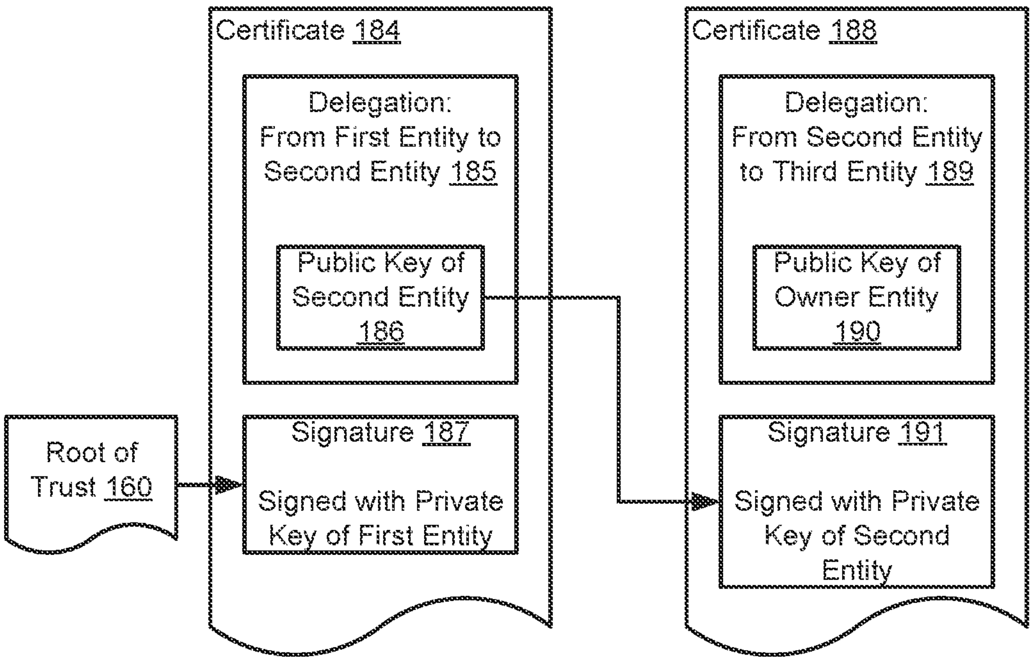
Figure 1H:
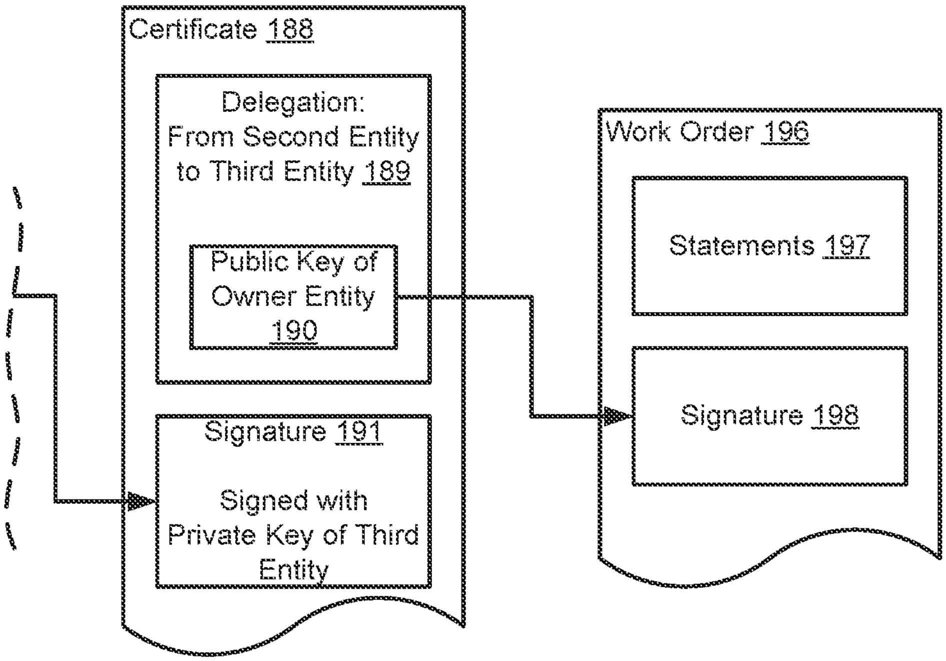

Private key 172 may be a private key of a public private key pair controlled by an entity that has authority over an endpoint device at the time authority over the endpoint device changes (e.g., via sale or other mechanism). In a scenario in which the manufacturer is the seller, the private key corresponding to the root of trust may be private key 172. Similarly, in a scenario in which an intermediate owner is the seller, private key 172 may be the private corresponding to the public key included in the delegation statement in ownership voucher 176 that establishes the intermediate owner has the owner of the endpoint device. In other words, to establish a delegation of authority, the entity that has authority over the endpoint device as defined by the certificates of ownership voucher 176 may need to sign the ownership transfer data 170 to further delegate ownership and authority over the endpoint device. By doing so, a chain of delegations that are cryptographically verifiable back to the root of trust may be established. Refer to FIGS. 1F-1H for additional details regarding establishing chains of delegations.

Any number of certificates may be added to ownership voucher 176 thereby enabling certificate chains that establish chains of delegation from the root of trust for an endpoint device. Ownership voucher 176 may, as discussed above, be used during onboarding.

Turning to FIG. 1E, a diagram of an example certificate 178 in accordance with an embodiment is shown. Certificate 178 may include delegation 179A and cryptographic data 179B.

Delegation 179A may include information (also referred to herein as "delegation information") documenting a delegation of authority/ownership over an endpoint device. For example, delegation 179A may include a public key, and indicate what is delegated to the entity that has control over the public private key pair of which the public key is a member. The extent of what is delegated may be specified at a macro level (e.g., ownership) or a micro level (e.g., limited authority).

Cryptographic data 179B may include signature usable to verify the integrity of delegation 179A and ascertain whether delegation 179A is valid.

To determine whether certificate 178 includes a valid delegation, an endpoint device may attempt to establish a chain of delegations back to the root of trust.

Turning to FIG. 1F, a diagram of an example certificate chain 182 of ownership voucher 176 in accordance with an embodiment is shown. Certificate chain 182 may be a series of certificates that can be sequentially validated back to the root of trust. To sequentially validate the certificate back to the root of trust, the first certificate (e.g., 178) in the chain may attempt to be validated using the root of trust (e.g., a public key). Thus, the first certificate in the chain may only be validated if the private key (e.g., controlled by the manufacturer) corresponding to the root of trust was used to sign certificate 178. Other certificates in the chain may be similarly validated by using the public key from the delegation statement of the previous certificate to check the signature in the next certificate in the chain. Certificate chain 182 may include any number of certificates (e.g., 178 through 180) that can be sequentially verified back to the root of trust. Refer to FIGS. 1G-1H for additional information regarding establishing valid certificate chains.

Turning to FIG. 1G, a diagram of an example process for validating a portion of a certificate chain of an ownership voucher in accordance with an embodiment is shown. In FIG. 1G, two certificates (e.g., 184, 188) from a certificate chain are shown.

As seen, certificate 184 may include delegation 185 which includes a public key (e.g., 186) of a second entity. The delegation statement may indicate that a first entity is delegating authority to the second entity.

Certificate 184 may include signature 187. Signature 187 may be generated using a private key controlled by the first entity that delegated authority to the second entity. In this example, the private key may correspond to root of trust 160 (e.g., may be a private corresponding to the public key installed when an endpoint device is manufactured).

To establish a certificate chain, signature 187 may be checked using root of trust 160. If verified as having been signed using the private key corresponding to the root of trust, then certificate 184 may be treated as being valid.

Like certificate 184, certificate 188 may include delegation 189 which includes a public key (e.g., 190) of a third entity, and in this example the owner. The delegation statement of delegation 189 may indicate that the second entity is delegating authority to the third entity (i.e., the owner).

Certificate 188 may include signature 191. Signature 91 may be generated using a private key controlled by the second entity that delegated authority to the third entity. In this example, the private key may correspond to the public key (e.g., 186) of the second entity which may be included in delegation 185.

To extend the certificate chain, signature 191 may be checked using public key of second entity 186. If verified as having been signed using the private key corresponding to public key of second entity 186, then certificate 188 may be treated as being valid.

Once the chain is established, the delegations (e.g., 185, 189) in the chain may be parsed to identify keys to which authority has been delegated from root of trust 160. These public key may then be used to decide whether various work orders are valid, which entities have authority of an endpoint device, and/or for other purposes.

For example, during onboarding, an endpoint device may evaluate whether to perform various work orders using the keys to which authority has been delegated.

Turning to FIG. 1H, a diagram of an example process for validating a work order in accordance with an embodiment is shown. In FIG. 1H, only a portion of the certificates (e.g., 184, 188) shown in FIG. 1G are shown for clarity.

When a work order (e.g., 196) is received by an endpoint device, the endpoint device may evaluate whether the entity issuing the work order has authority over the endpoint device. To do so, the endpoint device may parse the certificates to identify the public keys to which authority over the endpoint device has been delegated.

The endpoint device may then, using the keys, check a signature (e.g., 198) included in the work order. If the signature can be verified as having been generated using the private key corresponding to one of the public keys to which authority over the endpoint device has been delegated, then the endpoint device may treat work order 196 as having been issued by an entity with authority over it. For example, signature 198 may be checked using public key of owner entity 190, in this example.

The endpoint device may then, for example, process various statements 197 included in work order 196, and take action based on those statements. These statements may include instructions that change the manner of operation of the endpoint device to, for example, comply with security requirements of a new owner, and/or perform other actions.

Figure 1I:

For example, turning to FIG. 1I which shows a diagram in accordance with an embodiment, signed data 204 such as a work order may be validated if public keys included in ownership voucher certificate chains (e.g., 202) correspond to private keys to which the work order issuing entity has access. In this example, ownership voucher certificate chain 202 may be used to establish delegations of authority from root of trust 200 for an endpoint device to the keys used to sign signed data 204.

Figure 1J:
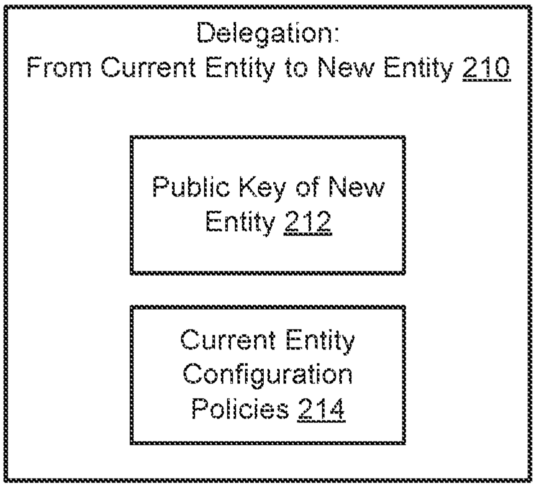

Turning now to FIG. 1J, FIG. 1J shows an example of a generic delegation 210 that delegates ownership and authority (full or partial) of the endpoint device from a current owner (also referred to herein as "current entity") to a new (e.g., subsequent) owner (also referred to herein as "new entity"). This delegation 210 can the same as any of the delegations (e.g., 179A, 185, 189, etc.) discussed in FIGS. 1E-1H.

As shown in FIG. 1J, in addition to new public key of new entity 212 (which could be any of cryptographic data 179B, public key of second entity 186, public key of owner entity 190 of FIGS. 1E-1H), the delegation 210 also includes current entity configuration policies 214.

Figure 1K:
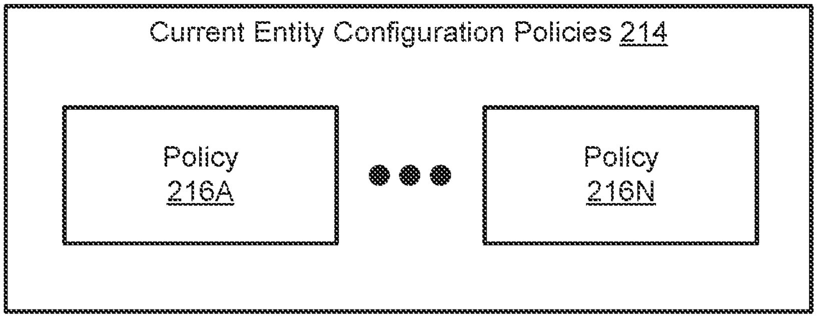

As shown in FIG. 1K, the current entity configuration policies 214 may include any number of policies 216A-216N. Each of these policies may be a configuration (e.g., onboarding configuration) related policy that defines rules, restrictions, requirements, or the like that are to be followed by the endpoint device during the endpoint device's onboarding process. For example, policy 216A may specify (e.g., indicate) that only a specific type of boot image may be loaded during onboarding while policy 216N may specify (e.g., indicate) that certain parameters (e.g., clock speed) of the endpoint device may be overridden. Another policy among policies 216A-216N may indicate who (i.e., which owner) has a highest authority among the various owners documented in the ownership voucher certificate chain. In general, any type of policies including rules, restrictions, requirements, or the like may be included in any of policies 216A-216N without departing from the scope of one or more embodiments disclosed herein.

Said another way, each policy 216A-216N may indicate which statements 197 in a received work order 196 may or may not be followed (e.g., executed, implemented, or the like) by the endpoint device receiving the work order 196.

The current entity configuration policies 214 may be created by the current owner of the endpoint device at any time and may be stored into the ownership voucher (as additional delegation information in delegation 210) when the endpoint device is being transferred (e.g., sold, given, or the like) from the current owner to the new owner.

In embodiments, the public key of new entity 212 may be merged with the current entity configuration policies 214 as one piece of data. For example, the current entity configuration policies 214 may be added as a flag to the public key of new entity 212. Because the current entity configuration policies 214, the policies 216A-216N included in the current entity configuration policies 214 will always be checked and enforced as the endpoint device walks through the ownership voucher certificate chain (e.g., as discussed in reference to FIGS. 1G-1I).

Figure 2A:
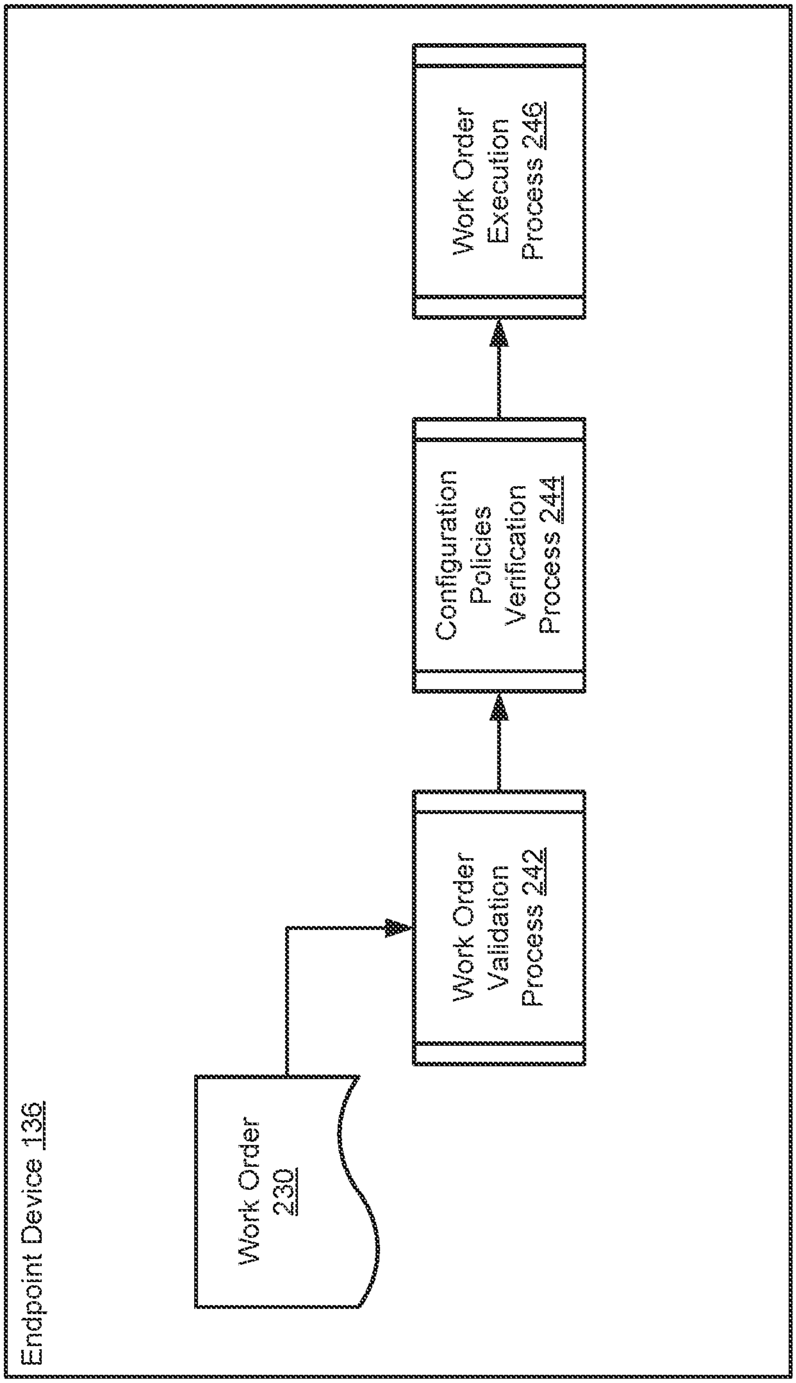
FIGS. 2A-2C show interaction diagrams in accordance with an embodiment.
Figure 2B:
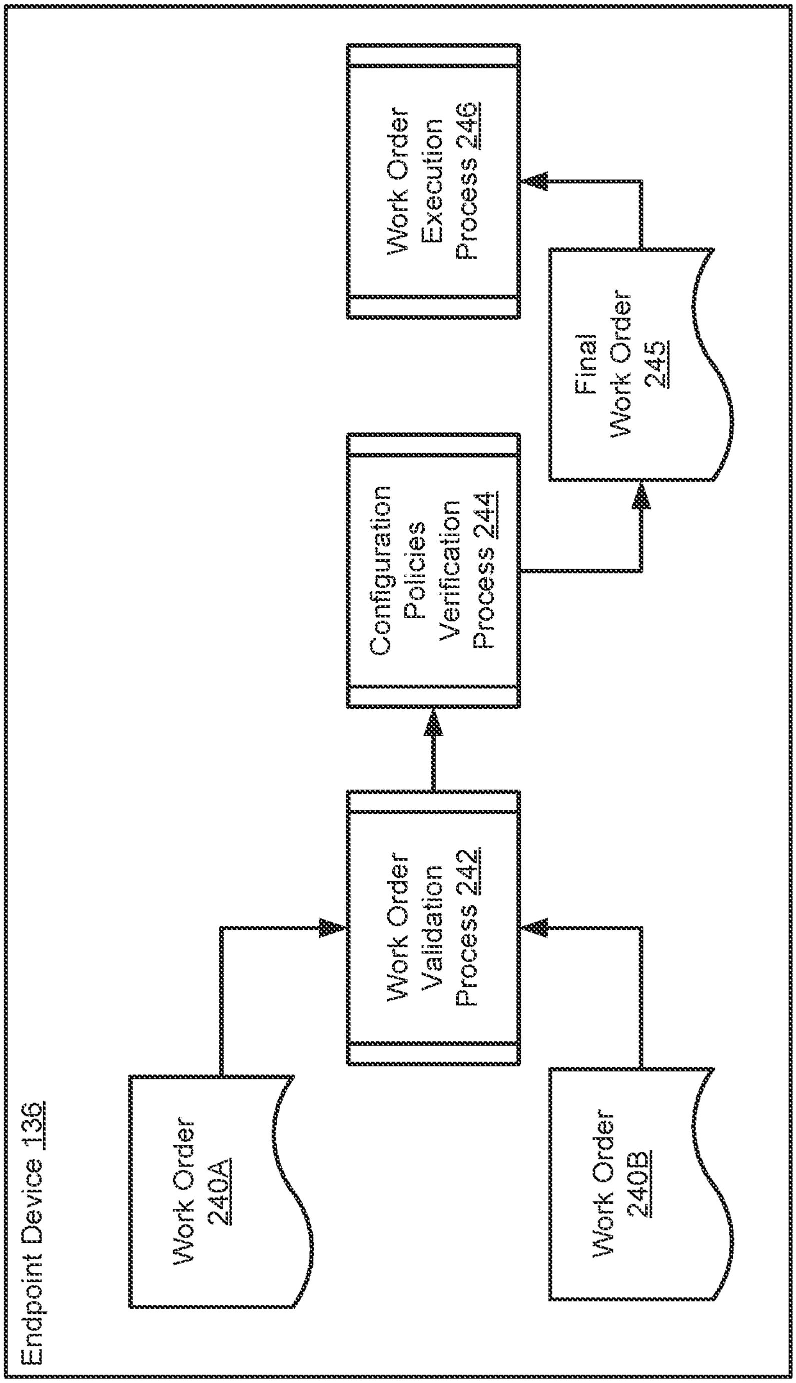
Figure 2C:
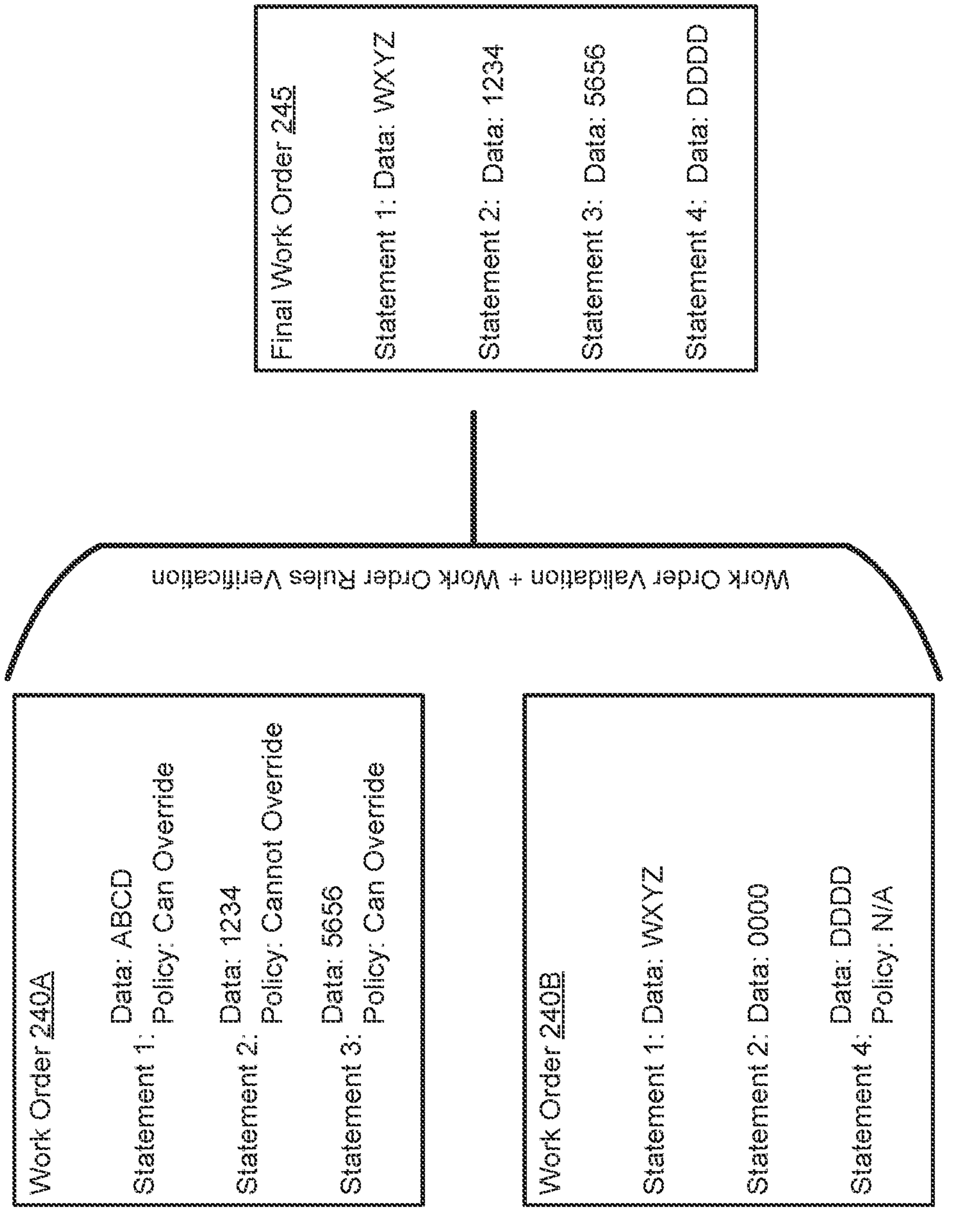

To further clarify embodiments disclosed herein, interactions diagrams in accordance with an embodiment are shown in FIGS. 2A-2C. These interactions diagrams may illustrate how data may be obtained and used within the system of FIGS. 1A-1K.

In the interaction diagrams, processes performed by and interactions between components of a system in accordance with an embodiment are shown. Data (e.g., files, packets, data structures, or the like) received or created by components of the system are illustrated using a first set of shapes (e.g., 230, 240A, 240B, 245, etc.). Processes performed by the components of the system are illustrated using a second set of shapes (242, 244, 246, etc.).

Generally, the processes and interactions are temporally ordered in an example order (as indicated using the arrows). For example, the process 242 may occur before process 244). However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during onboarding of an endpoint device. In particular, when a single work order (e.g., work order 230) is received by endpoint device 136 during an onboarding of the endpoint device 136.

In FIG. 2A, the single work order 230 may be received from any of the owners (current or previous) of the endpoint device 136 as the endpoint device is powered on for the first time and starts (e.g., initiates) its onboarding (e.g., to a deployment).

The work order 230 may be similar (or identical) to work order 196 discussed above in reference to FIG. 1H. In particular, work order 230 may include a signature (e.g., signature 198 of FIG. 1H) and statements (e.g., statements 197 of FIG. 1H).

Upon obtaining (e.g., receiving, retrieving, or the like) the work order 230, the endpoint device may perform work order validation process 242. As part of work order validation process 242, the endpoint device performs a process similar (or identical) to that discussed above in reference to FIG. 1G-1I where the endpoint device uses information included in an ownership voucher of the endpoint device to cryptographically validate an integrity of the work order 230 (e.g., to verify whether the work order 230 can be trusted).

In embodiments, only once the work order 230 is validated as trusted may the work order 230 be further processed by the endpoint device 136. Said another way, if the validation at work order validation process 242 fails, the work order 230 will be deleted by the endpoint device 136.

Once (and only if) the work order 230 has been successfully validated by the endpoint device 136, the endpoint device 136 performs configuration policies verification process 244 to determine which of the statement(s) included in work order 230 are permitted or barred from execution. Each of the statement(s) included in the work order 230 may include one or more operations to be executed by the endpoint device 136.

In the example of FIG. 2A where only a single work order 230 is being processed in configuration policies verification process 244, the endpoint device 136 may walk through all of the certificates in the ownership voucher to identify all of the current entity configuration policies (e.g., current entity configuration policies 214 of FIG. 1J) included in the ownership voucher of the endpoint device.

Once all of the current entity configuration policies are identified, the endpoint device 136 may further identify all policies (e.g., policies 216A-216N) included in each of the identified current entity configuration policies. Once all of the policies are identified, the endpoint device 136 may determine if any of the policies bar execution (and/or specifically permit execution) of any of the operations making up the statement(s) included in the work order 230.

In the event that any one policy (among the policies) bars execution of an operation in the statement(s) included in the work order 230, that operation will be skipped by the endpoint device (e.g., not executed/implemented) during the onboarding of the endpoint device.

In embodiments, there may be conflicts between one or more policies included in the identified current entity configuration policies. To resolve such conflicts, as one example, the endpoint device 136 may give policies in a more recent certificate (e.g., a newer certificate) within the certificate chain higher priority than policies included in an older certificate within the certificate chain. However, any form and/or type of conflict resolution techniques can be implemented to revolve said conflicts without departing from the scope of embodiments disclosed herein.

In embodiments, upon identifying all of the policies and applying them to the operations making up the statement(s) in the work order 230, the endpoint device 136 will understand which of these operations are barred by the policies and which of these operations are permitted by the policies. The endpoint device 136 may then execute all of the operations that are permitted by the policies as part of work order execution process (e.g., in an attempt to complete the onboarding). All operations are barred by the policies may be ignored (e.g., skipped) and/or deleted by the endpoint device 136.

Turning now to FIG. 2B, a second interaction diagram in accordance with an embodiment is shown. The second interaction diagram may illustrate processes and interactions that may occur during onboarding of an endpoint device. In particular, when multiple work orders (e.g., work order 240A and work order 240B) are received by endpoint device 136 during an onboarding of the endpoint device 136.

As shown in FIG. 2B, two work orders (work order 240A and work order 240B) are obtained (e.g., received, retrieved, or the like) by endpoint device 136. In this example of FIG. 2B, assume that: (i) work order 240A was received from a previous owner of the endpoint device 136; and (ii) work order 240B was received from a current owner of the endpoint device 136. Each work order 240A and 240B may include any number of statements (e.g., statements 197 of FIG. 1H) specifying operations to be performed (e.g., executed, followed, or the like) by the endpoint device 136 as part of the onboarding.

Further assume that work orders 240A and 240B may include conflicting operations. For example, one statement in work order 240A may specify that a disk image A should be loaded while another statement in work order 24B may specify that a different disk image B should be loaded. Other types of conflicting operations may be included without departing from the scope of embodiments disclosed herein.

Similar to FIG. 2A, both work orders 240A and 240B must be validated as trusted using work order validation process 242. Any work order that cannot be validated as trusted using the ownership voucher will be deleted by the endpoint device 136. If one of the two work orders 240A and 240B is deleted, the endpoint device 136 will follow the operations described above in reference to FIG. 2A to process the single remaining work order. If both work orders are deleted, the onboarding is halted until human intervention is provided (and/or until new work orders are obtained). If both work orders 240A and 240B are validated as trusted, the process of FIG. 2B proceeds as discussed below.

In particular, if both work orders 240A and 240B are validated as trusted, endpoint device 136 performs configuration policies verification process 244 to identify (as discussed above in reference to FIG. 2A) all policies included (e.g., specified, defined, or the like) in the ownership voucher to determine which operations making up the statement(s) in each work order 240A and 240B are permitted or barred from being executed.

Once all of the policies are identified and compared to the operations making up the statement(s) in each work order 240A and 240B, a final work order 245 is generated by merging all of the permitted operations from work order 240A and 240B. The final work order 245 will include a final set of operations to be executed by the endpoint device 136 to complete the onboarding. Said another way, the final set of operations included in the final work order will be executed as part of work order execution process 246.

Similar to FIG. 2A, there may be conflicts between one or more policies included in the identified current entity configuration policies. To resolve such conflicts, as one example, the endpoint device 136 may give policies in a more recent certificate (e.g., a newer certificate) within the certificate chain higher priority than policies included in an older certificate within the certificate chain. However, any form and/or type of conflict resolution techniques can be implemented to revolve said conflicts without departing from the scope of embodiments disclosed herein.

An example final work order 245 is shown in FIG. 2C. In particular, FIG. 2C shows an implementation example of the process described in FIG. 2B. As shown in FIG. 2C, work order 240A includes three (3) statements: statement 1, statement 2, and statement 3. Each of these statements specifies data (e.g., instructions) to be executed and/or applied during the onboarding of endpoint device 136. Work order 240B also includes three (3) statements: statement 1, statement 2, statement 4 that also each includes data to be executed and/or applied during the onboarding.

Assume now that statement 1 of each of the work orders 240A and 240B are directed to the same parameter and/or configuration (e.g., which disk image to load and boot, or the like); statement 2 of each of the work orders 240A and 240B are also directed to the same parameter and/or configuration (e.g., which application to install, or the like); while statements 3 and 4 of these work orders are directed to different parameters and/or configurations. Further assume that the ownership voucher includes current entity configuration policies defined by the previous owner associated with work order 240A and that the current entity configuration policies include policies stating/indicating: data of statement 1 can be overridden, data of statement 2 cannot be overridden, data of statement 3 can be overridden, and no policy on data of statement 4.

When the two work orders 240A and 240B are being merged into the final work order 245, the endpoint device 136 applies these policies to each statement. As a result, statement 1 in final work order 245 will include "Data: WXYZ" from work order 240B, statement 2 in final work order 245 will include "Data: 1234" from work order 240A (because a policy specifies that this data of statement 2 cannot be overridden (e.g., a policy exists that bars the operation making up statement 2 of work order 240B)), statement 3 from work order 240A (because work order 240B does not include a corresponding statement 3), and statement 4 from work order 240B (because work order 240A does not include a corresponding statement 4).

In FIG. 2C, statements 1-4 will then make up the final set of operations (of the final work order 245) to be executed by the endpoint device 136 to complete the onboarding.

Figure 3:
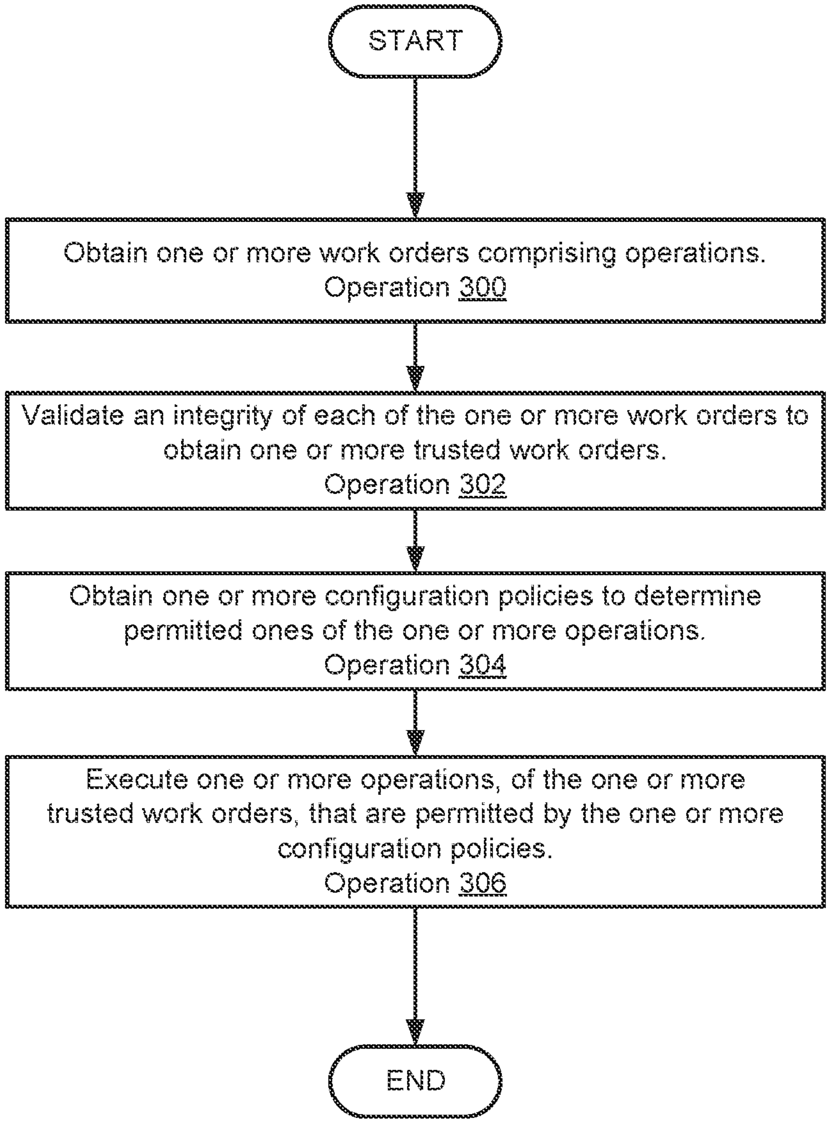
FIG. 3 shows a flow diagram illustrating a method in accordance with an embodiment.

As discussed above, the components of FIG. 1A may perform various methods to onboarding endpoint devices. FIG. 3 illustrates a method that may be performed by the components of the system of FIGS. 1A-1K. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for performing an onboarding in accordance with an embodiment is shown. The method may be performed by any of the components of the system shown in FIG. 1A.

In operation 300, as discussed above in reference to FIGS. 2A-2B, the endpoint device may obtain (from any of the owners (current or previous)) one or more work orders comprising operations (e.g., operations making up statements included in the work orders).

In operation 302, as discussed above in reference to FIGS. 2A-2B (namely, as part of work order validation process 242 of FIGS. 2A-2B), the endpoint device may validate an integrity of each of the one or more work orders obtained in operation 300 to obtain one or more trusted work orders (e.g., work orders that are validated as trusted using the ownership voucher of the endpoint device).

In operation 304, as discussed above in reference to FIGS. 2A-2B (namely, as part of configuration policies verification process 244), the endpoint device may retrieve one or more configuration policies (e.g., any number of current entity configuration policies 214 that each include policies 216A-216N as shown in FIG. 1J) and use the retrieved configuration policies to determine permitted (and/or barred) ones of the one or more operations.

In operation 306, as discussed above in reference to FIGS. 2A-2B (namely, as part of work order execution process 246), the endpoint device may execute the one or more operations (or the one or more trusted work orders) that are permitted by the one or more configuration policies. All of the operations that are barred by the one or more configuration policies may be deleted by the endpoint device.

The process may end following operation 306.

Figure 4:
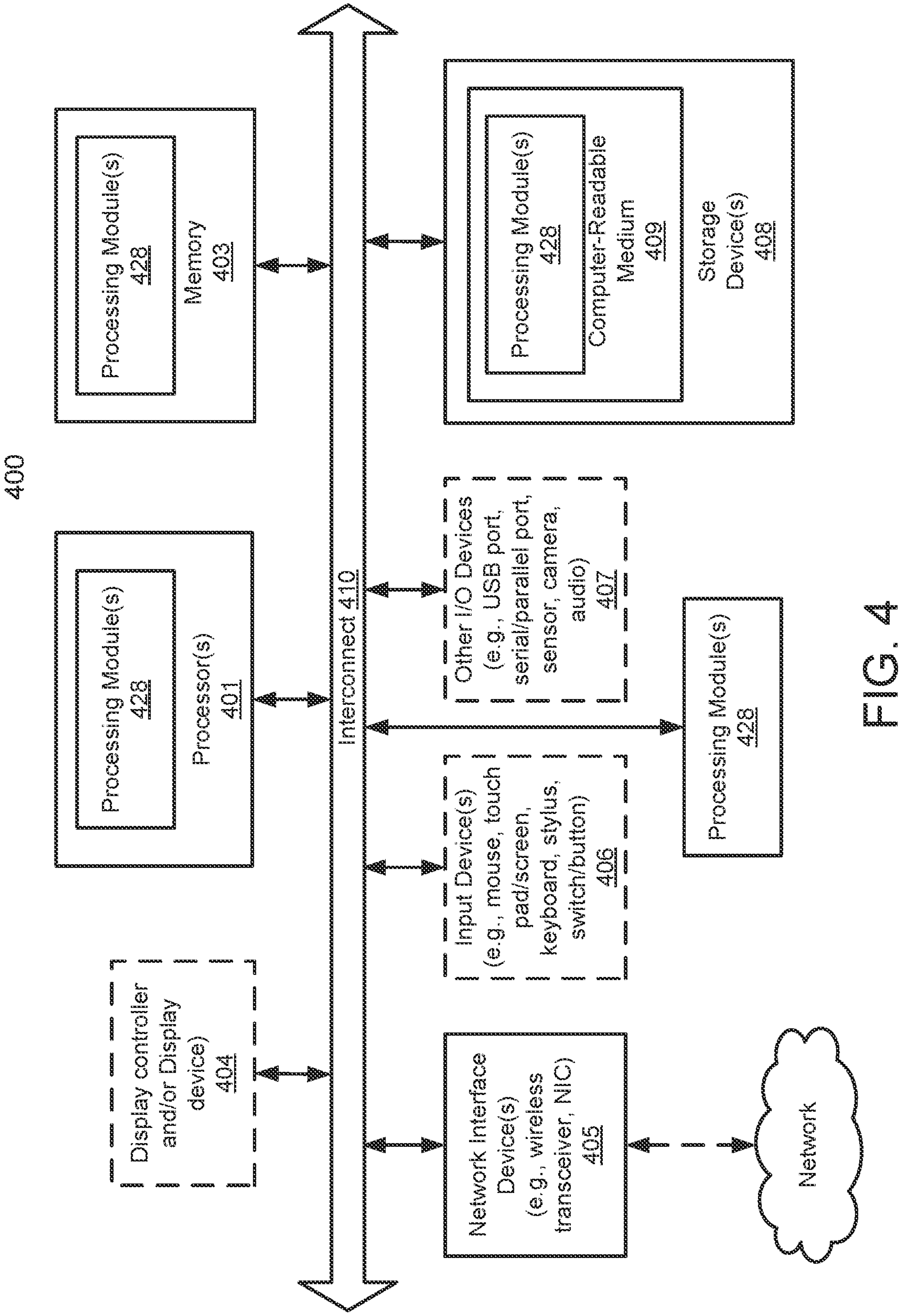
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for completing an onboarding of an endpoint device to a deployment comprising other endpoint devices, the method being executed by a hardware processor of the endpoint device and comprising:

establishing a first network connection with a rendezvous system that is configured to redirect the endpoint device to an orchestrator configured to manage the onboarding of the endpoint device to the deployment, the rendezvous system being separate from and remote to the orchestrator;

establishing, after terminating the first network connection with the rendezvous system upon being redirected by the rendezvous system to the orchestrator, a second network connection with the orchestrator;

obtaining, from the orchestrator and after establishing the second network connection with the orchestrator, one or more work orders generated by a current owner of the endpoint device, each of the one or more work orders comprising one or more operations to be executed to complete an onboarding of the endpoint device;

obtaining, from an ownership voucher of the endpoint device, one or more configuration policies that permit or bar execution of the one or more operations, the one or more configuration policies:

bar execution of operations that compromise a security of the endpoint device, are provisioned in the ownership voucher by a previous owner of the endpoint device that delegated ownership of the endpoint device to the current owner via the ownership voucher, and supersede the one or more work orders generated by the current owner even though the ownership of the endpoint device has already been delegated over to the current owner by the previous owner; and executing permitted ones of the one or more operations of the one or more work orders based on the one or more configuration policies to complete the onboarding of the endpoint device, wherein the one or more work orders comprise a first work order and the one or more operations of the first work order comprise a first operation, and executing the permitted ones of the one or more operations of the first work order based on the one or more configuration policies comprises:

determining whether at least one of the one or more configuration policies bar execution of the first operation;

in an instance where the execution of the first operation is barred by the at least one of the one or more configuration policies, skipping the first operation without executing the first operation as part of completing the onboarding of the endpoint device; and in an instance where the execution of the first operation is not barred by the at least one of the one or more configuration policies, executing the first operation as part of completing the onboarding of the endpoint device.

2. The method of claim 1, wherein the ownership voucher comprises delegation information associated with delegation of the endpoint device from the previous owner to the current owner, the one or more configuration policies being one of the delegation information.

3. The method of claim 2, further comprising:

after obtaining the one or more work orders and before executing the permitted ones of the one or more operations of the one or more work orders, validating an integrity of each of the one or more work orders using other ones of the delegation information beside the one or more configuration policies.

4. The method of claim 1, wherein obtaining the one or more work orders comprises:

obtaining a second work order comprising a second set of operations, the second work order being associated with the current owner of the endpoint device; and obtaining a third work order comprising a third set of operations, the third work order being associated with the previous owner of the endpoint device, and executing the permitted ones of the one or more operations further comprises:

generating a final work order based on the second work order, the third work order, and the one or more configuration policies, the final work order comprising a final set of operations, where in the final set of operations are executed as part of completing the onboarding of the endpoint device.

5. The method of claim 4, wherein the one or more configuration policies permit or bar execution of only operations of the second set of operations.

6. The method of claim 4, further comprising:

after obtaining the second work order and the third work order and before generating the final work order, validating that the second work order and the third work order are both trusted using the ownership voucher.

7. The method of claim 4, wherein the second set of operations comprises a second operation;

the third set of operations comprises a third operation, the second operation conflicts with the third operation; and generating the final work order comprises:

determining that at least one of the one or more configuration policies bar execution of the second operation; and including the third operation in the final set of operations instead of the second operation.

8. The method of claim 7, wherein the second set of operations comprises a fourth operation;

the third set of operations comprises a fifth operation, the fourth operation conflicts with the fifth operation; and generating the final work order comprises:

determining that the one or more configuration policies permit execution of the fourth operation; and including the fourth operation in the final set of operations instead of the fifth operation.

9. The method of claim 1, wherein the endpoint device is a late-binding, general-purpose computer that is to be onboarded at the deployment as a secured appliance, and the one or more work orders comprise an operation that compromises the security of the endpoint device such that execution of the operation by the endpoint device during the onboarding prevents the endpoint device from being onboarded at the deployment as the secured appliance.

10. The method of claim 9, wherein the operation that compromises the security of the endpoint device is barred from being executed by the endpoint device as along as one configuration policy among the one or more configuration policies bars execution of the operation even if other ones of the one or more configuration policies permit execution of the operation.

11. The method of claim 1, wherein the one or more configuration policies are provisioned in the ownership voucher to prevent the current owner from knowingly or unknowingly compromising the security of the endpoint device through the one or more work orders generated by the current owner.

12. A non-transitory machine-readable medium having instructions stored therein, which when executed by a hardware processor of an endpoint device to a deployment comprising other endpoint devices, cause the hardware processor to perform operations for completing an onboarding of the endpoint device to the deployment, the operations comprising:

establishing a first network connection with a rendezvous system that is configured to redirect the endpoint device to an orchestrator configured to manage the onboarding of the endpoint device to the deployment, the orchestrator being separate from and remote to the rendezvous system;

establishing, after terminating the first network connection with the rendezvous system upon being redirected by the rendezvous system to the orchestrator, a second network connection with the orchestrator;

obtaining, from the orchestrator and after establishing the second network connection with the orchestrator, one or more work orders generated by a current owner of the endpoint device, each of the one or more work orders comprising one or more operations to be executed to complete an onboarding of the endpoint device;

obtaining, from an ownership voucher of the endpoint device, one or more configuration policies that permit or bar execution of the one or more operations, the one or more configuration policies:

bar execution of operations that compromise a security of the endpoint device, are provisioned in the ownership voucher by a previous owner of the endpoint device that delegated ownership of the endpoint device to the current owner via the ownership voucher, and supersede the one or more work orders generated by the current owner even though the ownership of the endpoint device has already been delegated over to the current owner by the previous owner; and executing permitted ones of the one or more operations of the one or more work orders based on the one or more configuration policies to complete the onboarding of the endpoint device, wherein the one or more work orders comprise a first work order and the one or more operations of the first work order comprise a first operation, and executing the permitted ones of the one or more operations of the first work order based on the one or more configuration policies comprises:

determining whether at least one of the one or more configuration policies bar execution of the first operation;

in an instance where the execution of the first operation is barred by the at least one of the one or more configuration policies, skipping the first operation without executing the first operation as part of completing the onboarding of the endpoint device; and in an instance where the execution of the first operation is not barred by the at least one of the one or more configuration policies, executing the first operation as part of completing the onboarding of the endpoint device.

13. The non-transitory machine-readable medium of claim 12, wherein the ownership voucher comprises delegation information associated with delegation of the endpoint device from the previous owner to the current owner, the one or more configuration policies being one of the delegation information.

14. The non-transitory machine-readable medium of claim 13, wherein the operations further comprise:

after obtaining the one or more work orders and before executing the permitted ones of the one or more operations of the one or more work orders, validating an integrity of each of the one or more work orders using other ones of the delegation information beside the one or more configuration policies.

15. An endpoint device, comprising:

a hardware processor; and a memory coupled to the hardware processor to store instructions, which when executed by the hardware processor, cause the endpoint device to perform operations for completing an onboarding of the endpoint device to a deployment comprising other endpoint devices, the operations comprising:

establishing a first network connection with a rendezvous system that is configured to redirect the endpoint device to an orchestrator configured to manage the onboarding of the endpoint device to the deployment, the orchestrator being separate from and remote to the rendezvous system;

establishing, after terminating the first network connection with the rendezvous system upon being redirected by the rendezvous system to the orchestrator, a second network connection with the orchestrator;

obtaining, from the orchestrator and after establishing the second network connection with the orchestrator, one or more work orders generated by a current owner of the endpoint device, each of the one or more work orders comprising one or more operations to be executed to complete an onboarding of the endpoint device;

obtaining, from an ownership voucher of the endpoint device, one or more configuration policies that permit or bar execution of the one or more operations, the one or more configuration policies:

bar execution of operations that compromise a security of the endpoint device, are provisioned in the ownership voucher by a previous owner of the endpoint device that delegated ownership of the endpoint device to the current owner via the ownership voucher, and supersede the one or more work orders generated by the current owner even though the ownership of the endpoint device has already been delegated over to the current owner by the previous owner; and executing permitted ones of the one or more operations of the one or more work orders based on the one or more configuration policies to complete the onboarding of the endpoint device, wherein the one or more work orders comprise a first work order and the one or more operations of the first work order comprise a first operation, and executing the permitted ones of the one or more operations of the first work order based on the one or more configuration policies comprises:

determining whether at least one of the one or more configuration policies bar execution of the first operation;

in an instance where the execution of the first operation is barred by the at least one of the one or more configuration policies, skipping the first operation without executing the first operation as part of completing the onboarding of the endpoint device; and in an instance where the execution of the first operation is not barred by the at least one of the one or more configuration policies, executing the first operation as part of completing the onboarding of the endpoint device.

16. The endpoint device of claim 15, wherein the ownership voucher comprises delegation information associated with delegation of the endpoint device from the previous owner to the current owner, the one or more configuration policies being one of the delegation information.

17. The endpoint device of claim 16, wherein the operations further comprise:

after obtaining the one or more work orders and before executing the permitted ones of the one or more operations of the one or more work orders, validating an integrity of each of the one or more work orders using other ones of the delegation information beside the one or more configuration policies.

18. The endpoint device of claim 15, wherein the endpoint device is a late-binding, general-purpose computer that is to be onboarded at the deployment as a secured appliance, and the one or more work orders comprise an operation that compromises the security of the endpoint device such that execution of the operation by the endpoint device during the onboarding prevents the endpoint device from being onboarded at the deployment as the secured appliance.

19. The endpoint device of claim 18, wherein the operation that compromises the security of the endpoint device is barred from being executed by the endpoint device as along as one configuration policy among the one or more configuration policies bars execution of the operation even if other ones of the one or more configuration policies permit execution of the operation.

20. The endpoint device of claim 15, wherein the one or more configuration policies are provisioned in the ownership voucher to prevent the current owner from knowingly or unknowingly compromising the security of the endpoint device through the one or more work orders generated by the current owner.

* * * * *